(12) United States Patent
Chang

(10) Patent No.: US 7,443,615 B2
(45) Date of Patent: Oct. 28, 2008

(54) OPTICAL MEMBER EXCHANGING MECHANISM

(75) Inventor: Keng-Ming Chang, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 257 days.

(21) Appl. No.: 11/438,013

(22) Filed: May 19, 2006

(65) Prior Publication Data
US 2007/0070512 A1    Mar. 29, 2007

(30) Foreign Application Priority Data
Sep. 23, 2005  (CN) ................................. 94 1 33032

(51) Int. Cl.
*G02B 7/02* (2006.01)
(52) U.S. Cl. ........................................ 359/811; 359/813
(58) Field of Classification Search ................. 359/811, 359/813, 819, 821, 822, 894, 889
See application file for complete search history.

(56) References Cited

U.S. PATENT DOCUMENTS 5,576,897 A * 11/1996 Kuo ............................ 359/822
2004/0130653 A1* 7/2004 Nanjo et al. ................. 348/363

FOREIGN PATENT DOCUMENTS

JP         10-115858      *  5/1998

* cited by examiner

*Primary Examiner*—Timothy J Thompson
(74) *Attorney, Agent, or Firm*—Steven M. Reiss

(57) ABSTRACT

An optical member exchanging mechanism (9) for exchanging optical members (22) includes a body (10) and a sliding assembly (20). The body has an aperture (15) and a guiding rail (12). The sliding assembly is slidably mounted on the guiding rail of the body. The optical members are mounted in the sliding assembly. When the sliding assembly slides relative to the body, the sliding assembly exchanges the optical members to position another optical member adjacent to the aperture.

17 Claims, 3 Drawing Sheets

OPTICAL MEMBER EXCHANGING MECHANISM

BACKGROUND OF THE INVENTION

1. Field of the Invention

The present invention generally relates to optical mechanisms and, more particularly, to an optical member exchanging mechanism for an optical device such as a camera, especially for a camera used in a portable electronic device, a microscope, or such like.

2. Discussion of the Related Art

With the ongoing development of microcircuitry and multimedia technology, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere.

Digital images captured by digital camera modules can be edited by some software such as Adobe photoshop. Programs like Photoshop contain a large variety of image editing features. These programs have many functions, which allow the users to edit photographs. However, some faults in the digital camera module such as an excess exposure of a lens module of the camera module can not be overcome by software. Such a problem may be solved by adding a light module such as a light filter to reduce the amount of light in a certain wavelength passing through the lens module.

Therefore, an optical member exchanging mechanism whereby light modules such as light filters can be exchanged is desired.

SUMMARY OF THE INVENTION

An embodiment of an optical member exchanging mechanism for exchanging optical members includes a body and a sliding assembly. The body has an aperture and a guiding rail. The sliding assembly is slidably mounted on the guiding rail of the body. The optical members are mounted with the sliding assembly. When the sliding assembly slides relative to the body, the sliding assembly exchanges the optical members to position another optical member adjacent to the aperture.

Other advantages and novel features of the embodiments will become more apparent from the following detailed description thereof when taken in conjunction with the accompanying drawings.

BRIEF DESCRIPTION OF THE DRAWINGS

Many aspects of the present optical member exchanging mechanism can be better understood with reference to the following drawings. The components in the drawings are not necessarily drawn to scale, the emphasis instead being placed upon clearly illustrating the principles of the optical member exchanging mechanism and its potential applications. Moreover, in the drawings, like reference numerals designate corresponding parts throughout the several views.

DETAILED DESCRIPTION OF THE EMBODIMENTS

Figure 1:
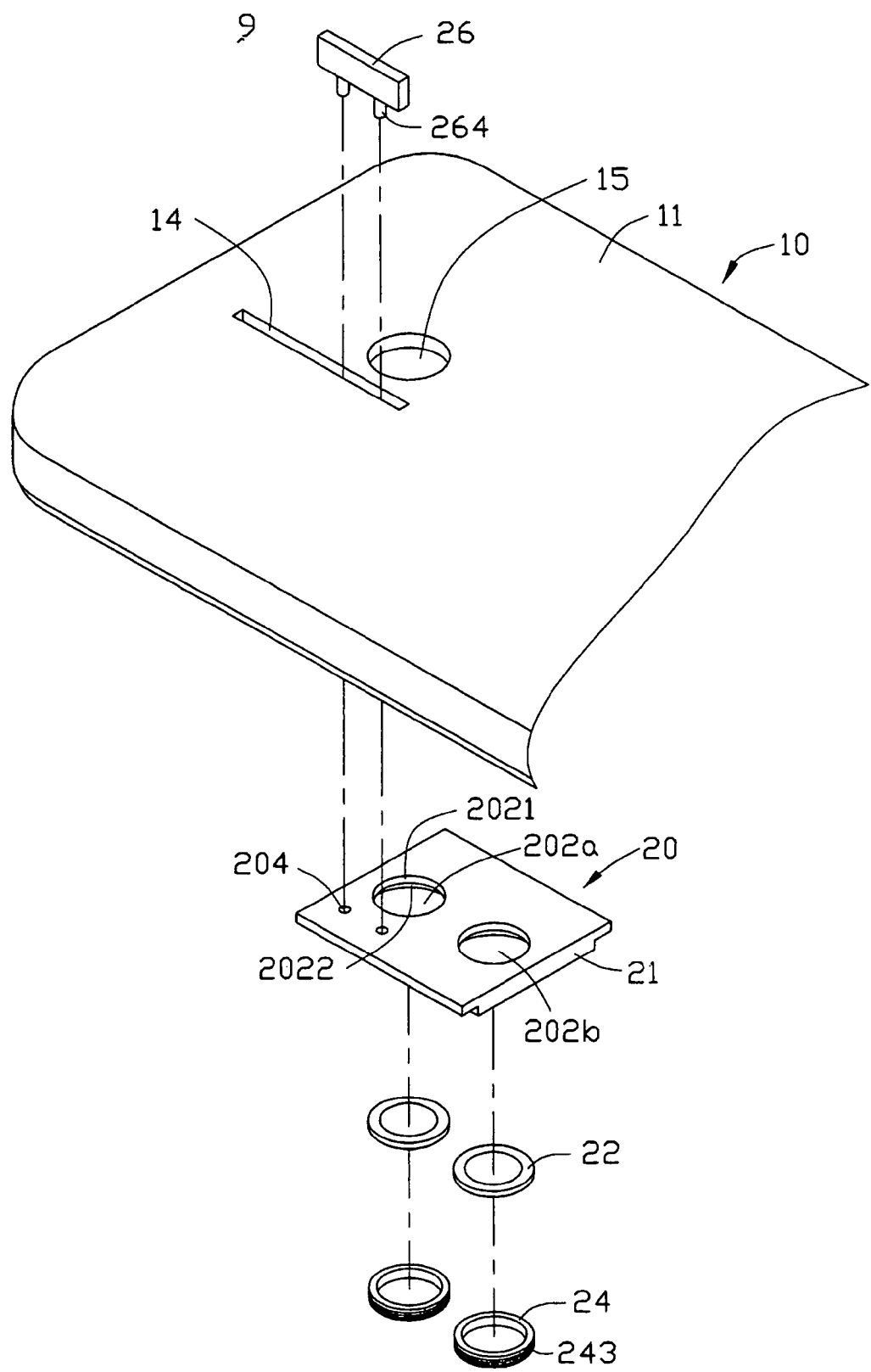
FIG. 1 is an exploded, isometric view of an optical member exchanging mechanism in accordance with a preferred embodiment.

Referring now to the drawings in detail, FIG. 1 shows an optical member exchanging mechanism 9 for use with a camera module. The camera module is taken here as an exemplary application, for the purposes of describing details of the optical member exchanging mechanism 9 of a preferred embodiment of the present invention. It is to be understood, however, that the optical member exchanging mechanism 9 could be suitably used in other environments (e.g. in microscopes). As such, although proving particularly advantageous when used in the camera module, the optical member exchanging mechanism 9 should not be considered limited in scope solely to an intended use environment of the camera module.

The camera module has a body 10. The optical member exchanging mechanism 9 includes a sliding assembly 20. The optical member exchanging mechanism 9 is configured for exchanging a plurality of optical members 22 of the camera module. The optical members 22 can be optical lens, lens module, light filters, or such like.

Figure 3:
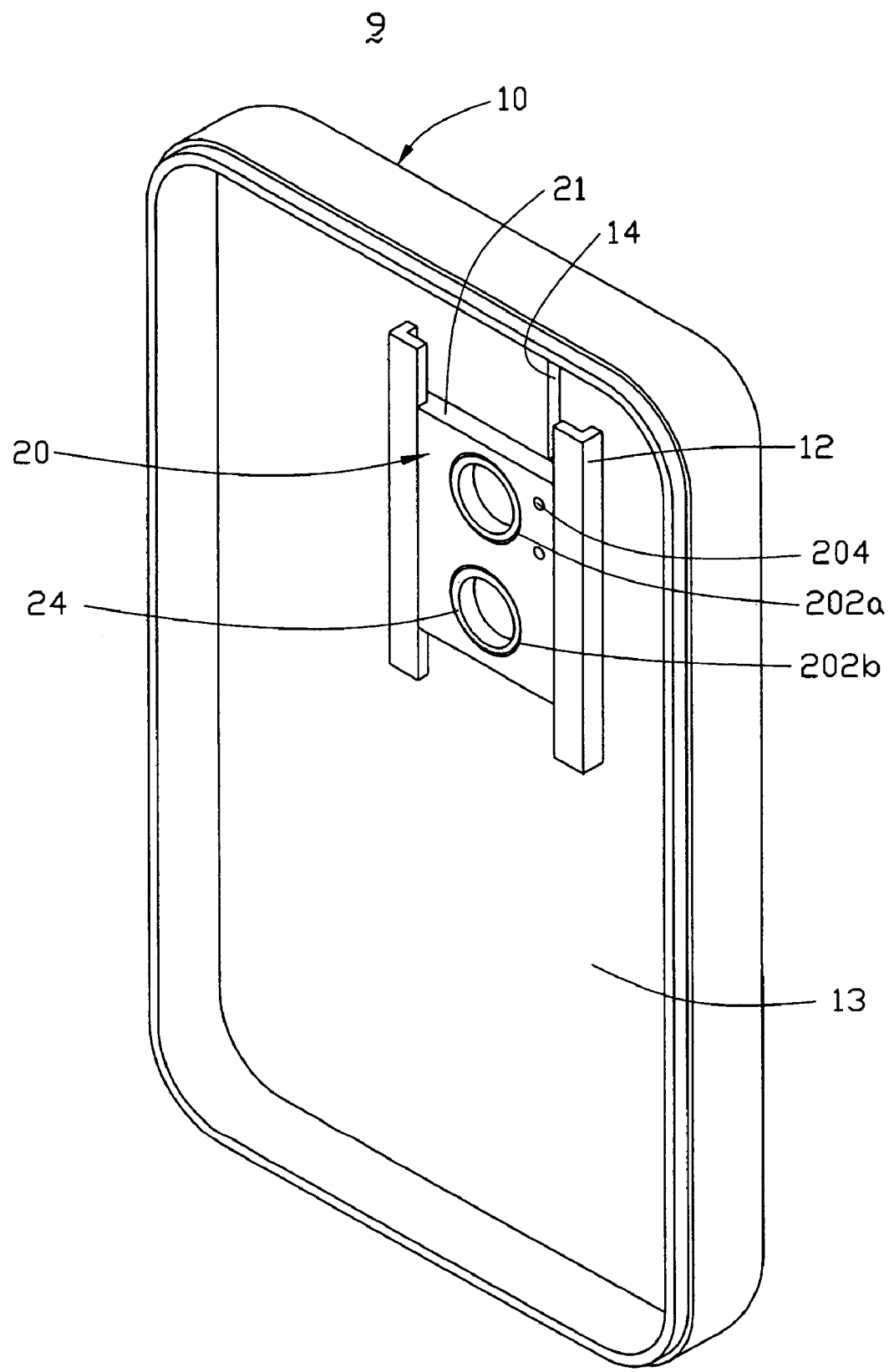
FIG. 3 is an assembled, isometric view of the optical member exchanging mechanism in FIG. 1.

Also referring to FIG. 3, the body 10 is rectangular in shape, and has an outer surface 11 at one side thereof and an inner surface 13 at an opposite side thereof. The body 10 defines a slot 14 and an aperture 15 therethrough. A pair of guiding rails 12 are formed on the inner surface 13. Each guiding rail 12 has an L-shaped cross section and aligned parallel to the slot 14. The guiding rails 12 face toward each other thereby cooperatively defining a channel (not labeled) therebetween. One guiding rail 12 is closer to the slot 14 than the other. The slot 14 has a first end adjacent the aperture 15 and a second end opposite to the first end.

Figure 2:
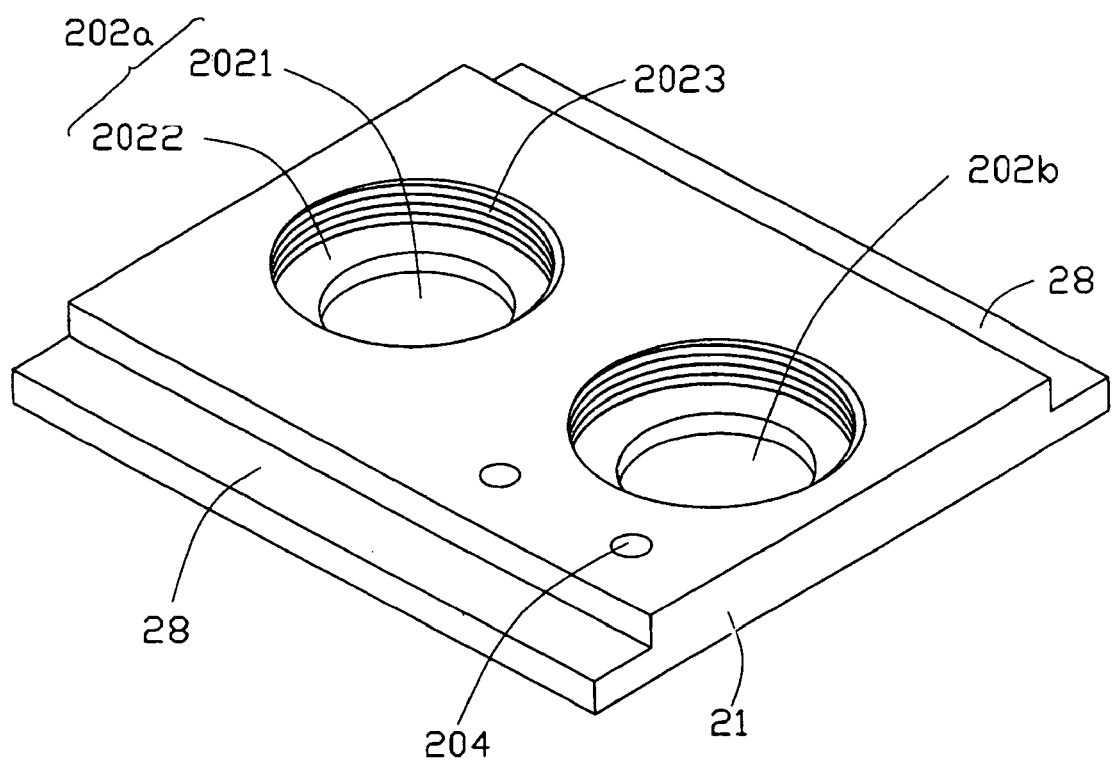
FIG. 2 is an isometric view of a sliding member of the optical member exchanging mechanism in FIG. 1.

Also referring to FIG. 2, the sliding assembly 20 includes a sliding member 21, a pair of mounting rings 24, and a guiding block 26. The mounting rings 24 are configured for mounting the optical members 22 in the sliding member 21.

The sliding member 21 is a substantially rectangular board. A pair of guiding arms 28 extend from two opposite ends of the sliding member 21. The guiding arms 28 are configured for engaging with the guiding rails 12 so that the sliding member 12 is slidably mounted on the guiding rails 12. The sliding member 21 defines a pair of round holes 202a, 202b therethrough. The round holes 202a, 202b are similar in shape. The round hole 202a has a light hole 2021 and a receiving hole 2022. The light hole 2021 and the receiving hole 2022 are arranged coaxially. A diameter of the receiving hole 2022 is larger than that of the light hole 2021. An inner screw thread 2023 is formed at an inner surface of the sliding member 21 in the receiving hole 2022. The sliding member 21 defines a pair of mounting holes 204 therein. The mounting holes 204 are positioned adjacent to the same guiding arm 28. A line connecting the two mounting holes 204 is parallel to a line connecting the two round holes 202a, 202b.

Each of the mounting rings 24 is circular in shape. An outer screw thread 243 is formed on a circumference of each mounting ring 24. The outer screw thread 243 is for engaging with the inner screw thread 2023 thereby mounting the optical member 22 in the receiving hole 2022.

The guiding block 26 is a small rectangular board. A pair of mounting pins 264 are formed at one side of the guiding block 26. Each mounting pin 264 is configured for engaging in a corresponding mounting hole 204 thereby mounting the guiding block 26 with the sliding member 21. A height of the guiding block 26 is larger than a thickness of the body 10 so that when the guiding block 26 is mounted with the sliding member 21, the guiding block 26 is exposed out of the slot 14.

In assembly, the optical members 22 are mounted in the receiving holes 2022 of the sliding member 21 by the engagement of the outer screw threads 243 of the mounting rings 24 with the inner screw threads 2023 of the sliding member 21. The guiding arms 28 of the sliding member 21 are inserted into one end of the channel of the body 10, and slide along the channel until the two mounting holes 204 are exposed through the slot 14. The guiding block 26 is mounted with the sliding member 21 by forcing the mounting pins 264 to fix in the mounting holes 204. Thus the optical member exchanging mechanism 9 is assembled with the body 10 of the camera module, as shown in FIG. 3. A camera lens module (not shown) is mounted relative to the body 10 adjacent to the sliding member 21. The camera lens module and the aperture 15 of the body 10 share the same main axis.

When the guiding block 26 abuts the first end of the slot 14, the optical member 22 in the mounting hole 202a is exposed fully out of the aperture 15. The camera lens module receives the light passing through the aperture 15 and the optical member 22 in the mounting hole 202a. When a user wants to use another optical member 22 in the mounting hole 202b, the guiding block 26 is moved away from the first end of the slot 14 along the slot 14. At the same time, the sliding member 21 slides along the guiding rails 12 away from the first end of the slot 14. The guiding block 26 stops moving when the guiding block 26 reaches the second end of the slot 14. Now, the optical member 22 in the mounting hole 202b is exposed fully out of the aperture 15. The camera lens module receives the light passing through the aperture 15 and the optical member 22 in the mounting hole 202b.

It is to be understood that the amount of the mounting holes may be more in order to exchange more optical members 22.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical member exchanging mechanism for exchanging optical members, comprising:
   a body having an aperture, a guiding rail, and a slot therethrough; and
   a sliding assembly slidably mounted on the guiding rail of the body, the optical members being mounted with the sliding assembly;
   wherein the slot is configured for manually controlling the sliding assembly therethrough, and if the sliding assembly slides relative to the body, the sliding assembly exchanges the optical members to position another optical member aligning with the aperture.

2. The optical member exchanging mechanism as claimed in claim 1, wherein the sliding assembly includes a guiding block, the guiding block is mounted with the sliding assembly through the slot of the body, and the guiding block is exposed out of the slot 3. The optical member exchanging mechanism as claimed in claim 2 wherein the sliding assembly further includes a sliding member, the sliding member defines a mounting hole therein, the guiding block has a mounting pin formed at one end thereof, and the mounting pin is forced into the mounting hole thereby mounting the guiding block and the sliding member together.

4. The optical member exchanging mechanism as claimed in claim 3, wherein the sliding member defines a plurality of holes therein for receiving the optical members therein.

5. The optical member exchanging mechanism as claimed in claim 4, wherein the hole of the sliding member includes a light hole and a receiving hole, the light hole and the receiving hole are arranged coaxially.

6. The optical member exchanging mechanism as claimed in claim 5, wherein the receiving hole is configured for receiving the optical member therein, and a diameter of the receiving hole is larger than that of the light hole.

7. The optical member exchanging mechanism as claimed in claim 6, wherein the sliding assembly further includes a mounting ring, an outer screw thread formed on a circumference of the mounting ring, an inner screw thread formed at an inner surface of the sliding member in the receiving hole, and where the outer screw thread is engaged with the inner screw thread thereby mounting the mounting ring with the sliding member.

8. The optical member exchanging mechanism as claimed in claim 1, wherein two guiding rails are formed at one side of the body, the sliding assembly is mounted with the guiding rails, and the sliding assembly is slidable along the guiding rails.

9. The optical member exchanging mechanism as claimed in claim 8, wherein the guiding rails are L-shaped and parallel to each other.

10. A camera module having a plurality of optical members, comprising:
    a body having an aperture, a guiding rail, and a slot therethrough; and
    an optical member exchanging mechanism including a sliding assembly , the sliding assembly being slidably mounted on the guiding rail of the body, the optical members being mounted with the sliding assembly;
    wherein the slot is configured for enabling manual control of the sliding assembly therethrough, and if the sliding assembly slides relative to the body, the sliding assembly exchanges the optical members to position another optical member aligning the aperture.

11. The camera module as claimed in claim 10, wherein the sliding assembly includes a guiding block, the guiding block is mounted with the sliding assembly through the slot of the body, and the guiding block is exposed out of the slot.

12. The camera module as claimed in claim 10, wherein two guiding rails are formed at one side of the body, the sliding assembly is mounted with the guiding rails, and the sliding assembly is slidable along the guiding rails.

13. The camera module as claimed in claim 12, wherein the guiding rails are L-shaped and parallel to each other.

14. camera module having a plurality of optical members, comprising:
    a camera body having an aperture and a guiding rail; and
    an optical member exchanging mechanism positioned inside the camera body and including a sliding assembly, the sliding assembly being slidably mounted on the guiding rail of the body, the optical members being mounted with the sliding assembly;
    wherein if the sliding assembly slides relative to the body, the sliding assembly exchanges the optical member aligning the aperture with a different optical member aligning the aperture.

15. The camera module of claim 14, wherein the body defines a slot therethrough, and the slot is configured for manually controlling the sliding assembly therethrough.

16. The camera module of claim 15, wherein the sliding assembly further includes a sliding member and a guiding block mounted with the sliding member through the slot of the body, and the guiding block is exposed out of the slot.

17. The camera module of claim 16 wherein the sliding member defines a mounting hole therein, the guiding block has a mounting pin formed at one end thereof, and the mounting pin is forced into the mounting hole thereby mounting the guiding block and the sliding member together.

* * * * *